United States Patent [19]

Cheng

[11] 4,372,110
[45] Feb. 8, 1983

[54] NOISE SUPPRESSOR FOR TURBO FAN JET ENGINES

[76] Inventor: James C. Fletcher, Administrator of the National Aeronautics and Space Administration, with respect to an invention of Dah Y. Cheng, Palo Alto, Calif.

[21] Appl. No.: 657,903

[22] Filed: Feb. 13, 1976

[51] Int. Cl.³ .................... F02K 1/44; F02K 1/46
[52] U.S. Cl. .................... 60/262; 60/269; 60/271; 239/265.17; 181/213
[58] Field of Search .................... 60/262, 271, 269; 239/265.13, 265.17, 127.3; 181/33 HB, 33 HC

[56] References Cited

U.S. PATENT DOCUMENTS

| | | | |
|---|---|---|---|
| 2,949,734 | 8/1960 | Bertin et al. | 239/265.17 |
| 3,048,971 | 8/1962 | Alford | 181/33 HC |
| 3,463,402 | 8/1969 | Langston | 181/33 HC |
| 3,581,841 | 6/1971 | Raynes | 239/265.13 |
| 3,721,389 | 3/1973 | MacKinnon et al. | 181/33 HB |

FOREIGN PATENT DOCUMENTS

| | | | |
|---|---|---|---|
| 225269 | 11/1958 | Australia | 60/262 |
| 523427 | 4/1921 | France | 239/265.17 |
| 584254 | 1/1947 | United Kingdom | 60/319 |

OTHER PUBLICATIONS

Cheng, D. Y. et al., "Experimental Study on Optimization Parameters of a Supersonic Jet Ejector", *Journal of Aircraft*, Sep. 1973, pp. 569-570.
Schaum's Outline Series, *Fluid Dynamics*, McGraw-Hill, N.Y., 1967, pp. 190-191.

*Primary Examiner*—Robert E. Garrett
*Attorney, Agent, or Firm*—D. Brekke; J. Manning

[57] ABSTRACT

A noise suppressor for installation on the discharge or aft end of a turbo fan engine. Within the suppressor are fixed annular airfoils which are positioned to reduce the relative velocity between the high temperature fast moving jet exhaust and the low temperature slow moving air surrounding the same. Within the suppressor nacelle is an exhaust jet nozzle which constrains the shape of the jet exhaust to a substantially uniform elongate shape irrespective of the power setting of the engine. Fixed ring airfoils within the suppressor nacelle therefore have the same salutary effects irrespective of the power setting at which the engine is operated.

3 Claims, 8 Drawing Figures

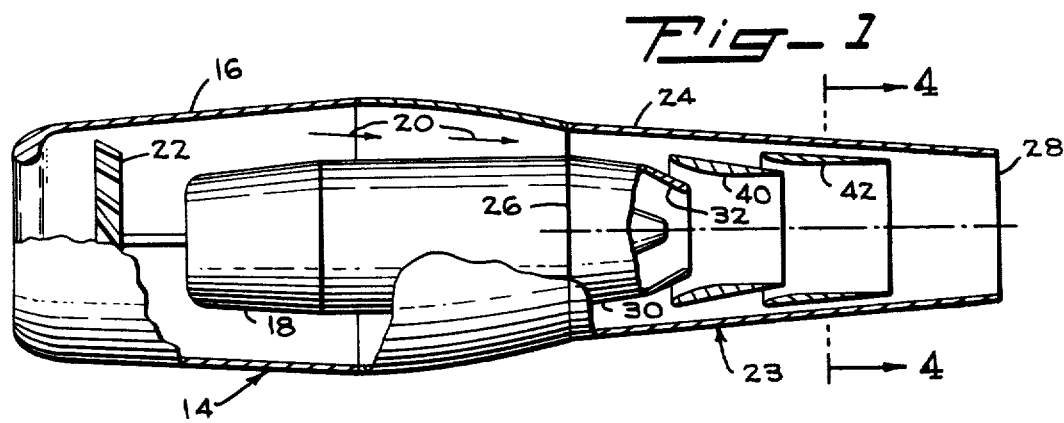
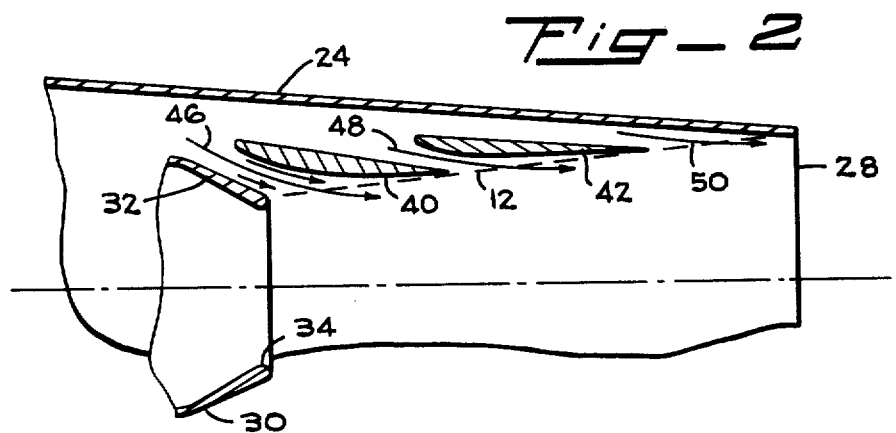
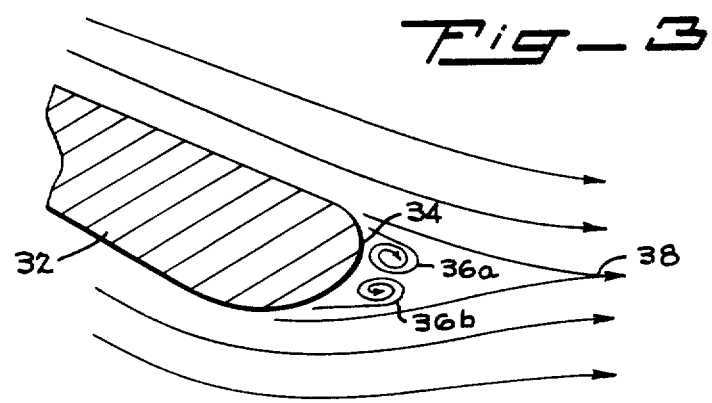

NOISE SUPPRESSOR FOR TURBO FAN JET ENGINES

The invention described herein was made in the performance of work under a NASA contract and is subject to the provisions of Section 305 of the National Aeronautics and Space Act of 1958, Public Law 85-568 (72 Sta. 435; 42 U.S.C. 2457).

BACKGROUND OF THE INVENTION

1. Field of the Invention

This invention relates to a noise suppressor for a fan jet engine and more particularly to such a noise suppressor that has no moving parts, that minimizes thrust reduction and that is effective throughout all power settings of the engine.

2. Description of the Prior Art

U.S. Pat. No. 3,463,402 discloses a jet noise suppressing structure having movable flaps, the position of which is changed in accordance with the power setting of the engine.

U.S. Pat. No. 3,613,996 discloses an ejector ring adapted to be mounted behind the nozzle of a jet engine to afford intermixing of ambient air with the exhaust gas stream. The patented apparatus employs adjustable vanes and mechanisms for positioning the vanes in accordance with engine operating levels.

U.S. Pat. No. 3,710,890 discloses an aircraft engine noise suppressor which reroutes the single exhaust flow of a jet engine into a corrugated flow pattern of at least twenty separate paths. The patented structure requires many structural parts, which add substantial weight to the aircraft and also have movable vanes together with the linkage necessary to control the position of the vanes in accordance with engine operating levels.

SUMMARY OF THE INVENTION

An object of the present invention is to provide a noise suppressor for fan jet engines which has no moving parts. This object is achieved by providing a nozzle that circumscribes the main jet exhaust and which constrains the exhaust configuration to a substantially constant elongate shape irrespective of the power setting at which the engine is operated. Downstream of such constant shaped jet exhaust is one or more ring airfoils which inject relatively cool air into the hot exhaust jet configuration so as to reduce shear levels and achieve a consequent reduction in noise.

Another object is to provide a noise suppressor of extremely light weight. Because the suppressor of the invention has no moving parts, no control linkages and the like are required, wherefore the weight of the structure is minimal.

Also contributing to the extreme light weight of the noise suppressor of the invention is the fact that the above mentioned ring airfoil has its upstream end outside of the high temperature jet exhaust gases. Accordingly the surfaces of such airfoil can be formed by extremely light weight material since such material is not subjected to impingement by the extremely hot, fast moving exhaust gases.

A further object is to provide a noise suppressor that only minimally reduces engine thrust. This object is achieved by the suppressor of the invention because the relatively cold air is injected into the hot jet exhaust path at an extremely small angle from the axial direction.

The foregoing together with other objects, features and advantages will be more apparent after referring to the following specification and the accompanying drawings.

BRIEF DESCRIPTION OF THE DRAWINGS

FIG. 1 is a partially schematic elevation view in cross section of a fan jet engine supplied with a noise suppressor according to the invention.

FIG. 2 is an enlarged fragmentary view of the suppressor showing paths of air movement therein.

FIG. 3 is an enlarged fragmentary view showing the jet exhaust shaping nozzle and the properties thereof that provide substantially uniform operation for all engine power settings.

FIG. 5 is a plot of noise level vs. angular position on a fan jet engine supplied with the suppressor of the invention.

DETAILED DESCRIPTION OF THE PREFERRED EMBODIMENTS

Figure 3A:
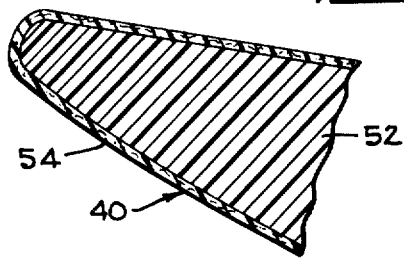
FIG. 3A is a fragmentary view at enlarged scale of another portion of the suppressor of FIG. 1.
Figure 4:
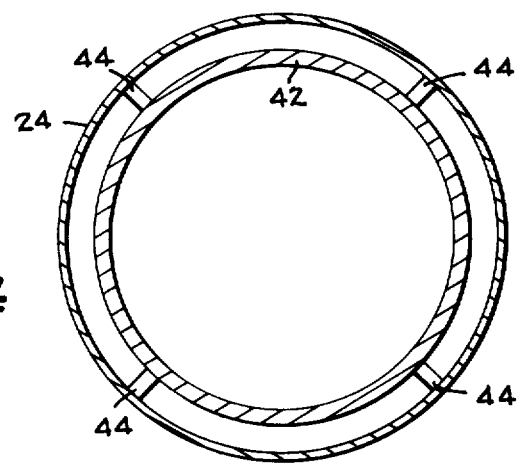
FIG. 4 is an enlarged cross sectional view taken generally at plane designated by line 4—4 of FIG. 2.

Before making specific reference to the embodiments shown in the accompanying drawings, certain theoretical aspects of the invention will be explained. Although a fan jet engine produces noise from the fan itself, from the fan discharge duct and from the primary jet, the magnitude of noise arising from the latter source is significantly greater than the noise from the first two sources. At normal power settings of a fan jet engine, the velocity of the primary jet exhaust is approximately 40% higher than the velocity of the fan discharge. Accordingly, at the aft end of the engine are two relatively moving streams between which there is substantial shear stress. Such shear stress is the primary source of noise from the engine. According to the present invention, the fan discharge air, which is relatively slow moving and which surrounds the hot jet exhaust, is injected radially inward to reduce the shear stress and therefore to reduce noise.

Lighthill's theory [Lighthill, J. J.: Jet Noise, *AIAA Journal*, Vol 1, July 1963, pp 1507-1517] provides a guideline for subsonic nozzle design which is useful in analyzing jet noise. The governing equation for jet noise production $$\frac{\partial^2 \rho}{\partial t^2} - c^2 \nabla^2 \rho = \frac{\partial^2 T_{ij}}{\partial x_i \partial x_j}$$

is a wave equation with a driving function $$\frac{\partial^2 T_{ij}}{\partial x_i \partial x_j},$$

wherein $\rho$ is equal to the density, t is time, c is the speed of sound, $\overline{T}$ is temperature, $T_{ij}$ is the $i^{th}$ momentum in the $j^{th}$ direction and x is the coordinate. If $T_{ij}$ is a sourcelike function such that $T_{ij} = \phi/r$ (wherein $\phi$ indicates the strength of a source and r is the radial dimension in a spherical system of coordinates), order of magnitude arguments show that $$\frac{\partial^2 T_{ij}}{\partial x_i \partial x_j}$$

will be a quadrupole function $\phi/r^3$ (wherein r is the radial dimension in a spherical system). It follows that reducing the driving function, $$\frac{\partial^2 T_{ij}}{\partial x_i \partial x_j},$$

will reduce the noise.

The high velocity flow entrains the slower surrounding fluid through the shear stress, where the high velocity flow is being slowed down, and the slower surrounding fluid is being accelerated. This also produces an inward motion of the slower fluid (momentum) into the faster fluid.

If a momentum flux is imposed radially inward onto the hot core jet, in effect it reduces the work done by the hot core jet for entrainment. This is equivalent to the reduction of the local shear stress. The gradient of the shear stress will be reduced as well. This process can best be seen from the momentum transport theory of Reichardt. [Schlitchting, H., "Boundary Layer Theory," McGraw-Hill, Inc. 6th Ed. 1968, pp 702.] Although Reichardt's theory is based on a two dimensional system, the extension of that theory to the three dimensional environment of the cylindrical jet is straightforward.

Reichardt's basic equation is a time average momentum equation that $$\frac{\partial}{\partial x}\left(\frac{\bar{p}}{\rho} + \bar{u}^2\right) + \frac{\partial \overline{uv}}{\partial y} = 0$$

in a free turbulent flow, the laminar shear stress being neglected. In the foregoing, p is pressure, u is the axial velocity component, and y is the radial coordinate of a cylindrical coordinate system within the jet, and $\overline{uv}$ is the Reynolds shear stress divided by the average density $\rho$. The pressure term vanishes for a subsonic jet, and Reichardt's second basic equation, of an empirical nature, has the form $$\overline{uv} = -\Lambda \frac{\partial \bar{u}^2}{\partial y},$$

wherein $\Lambda$ is the momentum diffusion length. Here $\Lambda = \Lambda(x)$ has the dimension of a length which is usually determined empirically. This is known as the momentum transfer length. The left hand side of the above equation represents the shearing stress, except for the factor $\rho$, which can be regarded as the quantity of the x component of momentum being transferred in the y direction (flux of momentum). This relationship leads the momentum equation of the Fourier heat transfer equation of the following form:

$$\frac{\partial \bar{u}^2}{x} = \Lambda(x) \frac{\partial^2 \bar{u}^2}{\partial y^2}.$$

The preceding equation describes the x component of momentum diffusion in a free turbulent jet flow. Injection of fluids, i.e. relatively cool fan air, is equivalent to reducing the x momentum transfer diffusion rate in the y direction, or a reduction in $\overline{uv}$. Interpretation of the momentum equation shows that the x component or jet momentum has to take longer distances to be dissipated in both the x and y directions. The injection nozzle design of the invention is made to reduce the entrainment work or local shear stress of the high velocity core jet. The by-pass fan air is made to flow in converging passages by ring airfoil separators that circumscribe the core jet. The shape of the ring airfoils is determined by matching the bypass nozzle area with the total throat area of the unmodified engine and the size of the ring airfoil flow separators were determined from similarity streamline analysis as taught by Cheng et al. [Cheng, D. Y., Wang, P., and Chisel, D. M., Journal of Aircraft 10, No. 9, pp 569–570, September 1973.] Subsonic jet stream lines are calculated from incompressible flow considerations. Turbulent circular jet similarity velocity profiles are given as follows:

$$\text{axial } u = \frac{3}{8\pi} \frac{K}{\epsilon_o x} \frac{1}{(1 + \frac{1}{4}\eta^2)^2}$$

$$\text{radial } v = \frac{1}{4}\sqrt{\frac{3}{\pi}} \frac{\sqrt{K}}{x} \frac{(\eta - \frac{1}{4}\eta^3)}{(1 + \frac{1}{4}\eta^2)^2}$$

$$\text{where } \eta = \frac{1}{4}\sqrt{\frac{3}{\pi}} \frac{\sqrt{K}}{\epsilon_o} \frac{y}{x}$$

wherein K is the constant kinematic momentum $$K = \int_0^{+\infty} \pi r u^2 \, dr,$$

$\eta$ is a dimensional similarity coordinate, and $\epsilon_o$ is the virtual kinematic viscosity. Experimental evidence has shown that the quantity $\epsilon_o/K$ is equal to 0.0161 for a turbulent jet. The radial velocity of the high temperature core jet has a zero value ($v=0$) at $\eta=2$.

Referring now to FIG. 2, a broken line 12 indicates a cross sectional view of an imaginary frusto conical surface wherein $v=0$. The imaginary frusto conical surface identified by broken line 12 in FIG. 2 delineates the locus of the jet exhaust where there is a zero radial velocity of the jet. As will appear in more detail hereinafter, a thick lipped nozzle is included in the upstream end of the suppressor to confine the jet core to the imaginary frusto conical surface represented by line 12 for all power settings of the engine. Moreover, relatively cold fan by-pass air is injected into the core jet at line 12 thereby to effect noise suppression with minimal effects on engine power output.

A typical fan jet engine with which the suppressor of the invention can be used to advantage is schematically identified in FIG. 1 at 14. The fan jet engine is contained within a housing 16 which is hollow and defines a shape having desired and well understood aerodynamic properties. Supported within the housing 16 is an engine pod 18 which has an external cross sectional shape less than the interior opening of housing 16 so as to form a bypass air path identified by arrows 20. Supported within housing 16 adjacent the inlet end thereof is a fan 22 which is powered from engine pod 18 and produces fan air, part of which is delivered to engine pod 18 for enhancing combustion therein and part of which is directed along bypass path 20.

Secured to the aft end of fan jet engine 14 is a suppressor 23 embodying the present invention. Suppressor 23 has a nacelle 24 which forms a rearward converging frusto conical passage, the nacelle having an upstream opening congruent with and joined to the outlet of housing 16 at 26 and a downstream opening 28 which lies in the imaginary surface identified by line 12 in FIG. 2.

Supported interior of nacelle 24 is a nozzle 30. The upstream end of nozzle 30, the left hand end as viewed in FIG. 1, is congruent to the jet exhaust discharge opening in engine pod 18. Nozzle 30 includes a downstream converging wall 32 which terminates in a thick lip 34 defining the nozzle opening for the hot jet exhaust. It will be noted that the angle of wall 32 with respect to the central axis of nacelle 24 is less than 45° and preferably less than 30°. An angle greater than 45° would generate stationary vortices or dead water regions within the nacelle which produce a single tone noise similar to that of a whistle.

From FIG. 3 it will be seen that lip 34 is relatively blunt, that is, it is radiused to converge smoothly with the inner and outer surface of wall 32. The consequence of the blunt tip is the creation of pair vortices identified in FIG. 3 at 36a and 36b, which rotate in opposite directions and create a dipole-like source. The pair vortices have the effect of creating a fictitious sharp lip identified at 38, the specific location of fictitious lip 38 varying according to flow conditions.

Mounted within nacelle 24 between nozzle 30 and downstream opening 28 are ring airfoils 40 and 42, which are supported within the nacelle by spokelike members 44. Ring airfoil 40 partially axially overlaps nozzle 30 and defines in combination with the exterior surface of wall 32 of the nozzle an annular injection nozzle through which air moves along a path 46. The downstream end of ring airfoil 40 is axially overlapped by the upstream end of ring airfoil 42 to form a second annular air injection nozzle through which bypass air is injected on a path 48. The downstream end of ring airfoil 42 in conjunction with the inner surface of nacelle 24 define a third annular injection nozzle, bypass air being injected through the latter nozzle along a path 50. As can be seen in FIG. 2 the downstream extremities of ring airfoils 40 and 42 reside on the imaginary surface indicated by line 12.

Ring airfoils 40 and 42 are configured so that the low pressure region of the airfoil occurs at the interior surface of the structure. The by-pass air and the hot jet exhaust are thus drawn into the low pressure region, thereby to create turbulence and to disrupt the noise producing shear line between the two relative moving streams.

It has been found that maximum noise suppression with minimum thrust loss is achieved by forming the angles of paths 46, 48 and 50 at progressively lesser convergent angles. The velocity of the jet exhaust through nozzle 32 decreases in the downstream direction so that the lesser angle of convergency downstream affords adequate mixing while a greater convergent angle upstream is necessary to disrupt the shear line existing in the imaginary plane identified by line 12. Contributing to the foregoing relationship is the different configuration of the ring airfoils 40 and 42. In one suppressor designed according to the present invention, ring airfoil 40 has a thickness-to-chord ratio, when viewed in cross section as in FIG. 2, of about 10%, whereas ring airfoil 42 has a thickness-to-chord ratio of about 6%. The greater ratio together with the different angular orientation of the respective airfoils achieves the function of delivering the relatively cool bypass air along path 46 at a greater inward angle than air is delivered along path 48.

Contributing to the extreme light weight of the suppressor of the invention is the fact that the upstream ends of ring airfoils 40 and 42 reside outside of the path of hot jet exhaust and within the relatively cooler path of bypass air. Accordingly the leading or upstream edge of the ring airfoils can be formed of a composite light weight structure having a core 52 of low density cellular material, such as plastic foam, covered with an impervious skin layer 54, such as fiberglass. Such composite structure, because it is outside of the hot main jet exhaust, suffices without adding substantial weight to the suppressor. Downstream of the leading edge of each of the airfoils and forming a smooth continuation of the exterior surface of fiberglass cover 54, the airfoils are formed from light weight thin sheet metal thus producing a monocoque structure possessing light weight and adequate strength.

The plot of FIG. 5 illustrates the operation of a noise suppressor according to the invention on a JT-15D fan jet engine at full power. In the figure the circumferential coordinate indicates the position relative the axis of the jet exhaust, zero degrees being directly behind the engine exhaust. The radial distance on the plot indicates the noise level, a greater diameter on the plot corresponding to a greater noise level. Broken line 60 identified the noise level at different positions around a bare engine, i.e. an engine without a noise suppressor. The solid line curve 62 in FIG. 5 indicates the noise level on an engine supplied with a noise suppressor of the type described hereinabove and shown in FIGS. 1 and 2. The asymmetry about the 0°–180° line is due to the measuring apparatus employed to gather the data for the plot, and not to any characteristic of the suppressor of the invention. It will be noted that at all angular positions relative to the axis of the engine, the noise level represented by curve 62 is substantially lower than the level represented by curve 60, and that directly behind the engine the noise is almost 15 db less than the noise produced by the bare engine. Notwithstanding the substantial noise reduction, the decrease in thrust is less than 10%. Stated otherwise, at full engine power noise suppression of about 0.89 db per percent thrust was achieved, a level of noise reduction superior to any known suppressors. Similar noise reductions are achieved at other power settings so that the suppressor of the invention can be employed without materially affecting the performance of the engine and the craft on which it is mounted.

Figure 6:
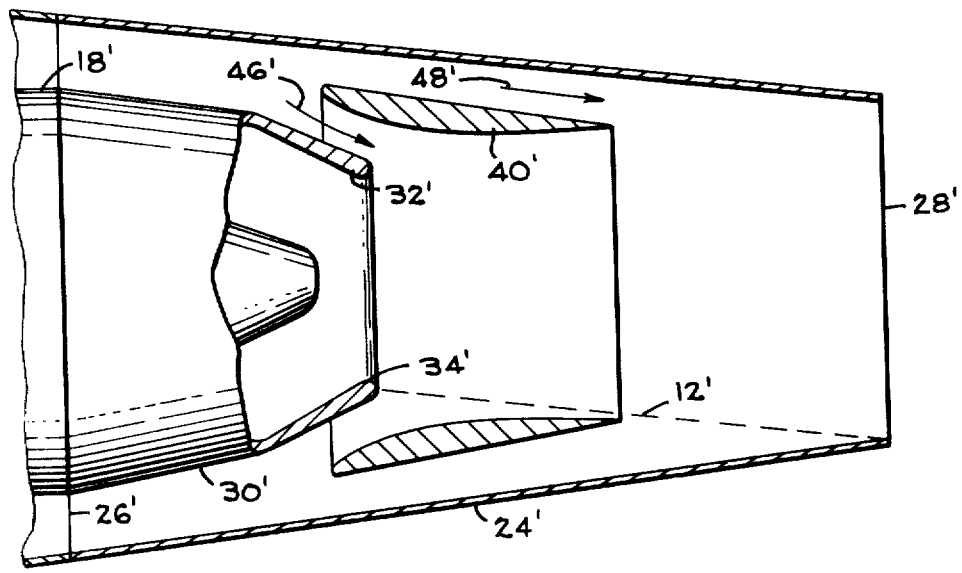
FIG. 6 is a cross sectional view of a modified form of noise suppressor.

The modified form of the suppressor shown in FIG. 6 illustrates the versatility of the invention. In the embodiment of FIG. 6 the same reference characters as employed in the above description are used, such reference characters being primed in FIG. 6. There is only one ring airfoil 40′ which is substantially identical to the corresponding ring airfoils described above. The airfoil cooperates with nozzle 30′ to form annular nozzles for admission of cool bypass air on paths 46′ and 48′. The nozzle 24′ is truncated where fictitious surface 12′ intersects the nacelle.

The presence of only one ring airfoil 40' defines the air paths identified at 46' and 48' in FIG. 2, but eliminates path 50, which raises the pressure of the jet exhaust within nacelle 24'. This modification of the invention is useful in engines having lower fan by-pass air pressures, because it increases the pressure within the suppressor as well as elongating the hot core jet somewhat. The embodiment of FIG. 6, although reducing loss of engine thrust less, affords a somewhat lesser degree of noise suppression than the embodiment described hereinabove in connection with FIGS. 1 and 2.

Figure 7:
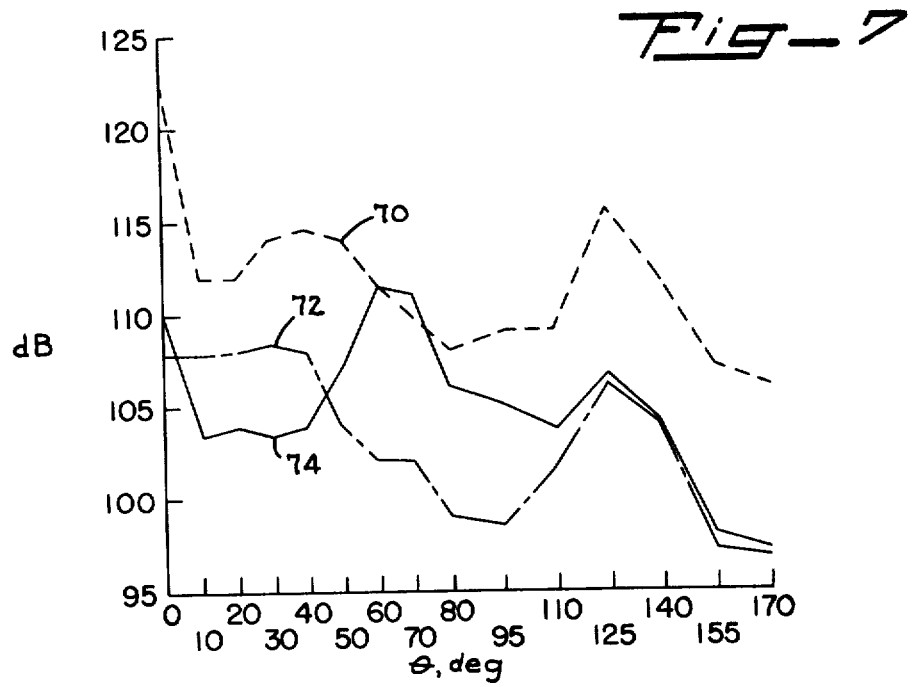
FIG. 7 is a plot of noise level vs. angular position comparing the embodiments of FIGS. 1-4 with the embodiment of FIG. 6 and an engine without any noise suppressor.
Figure 8:
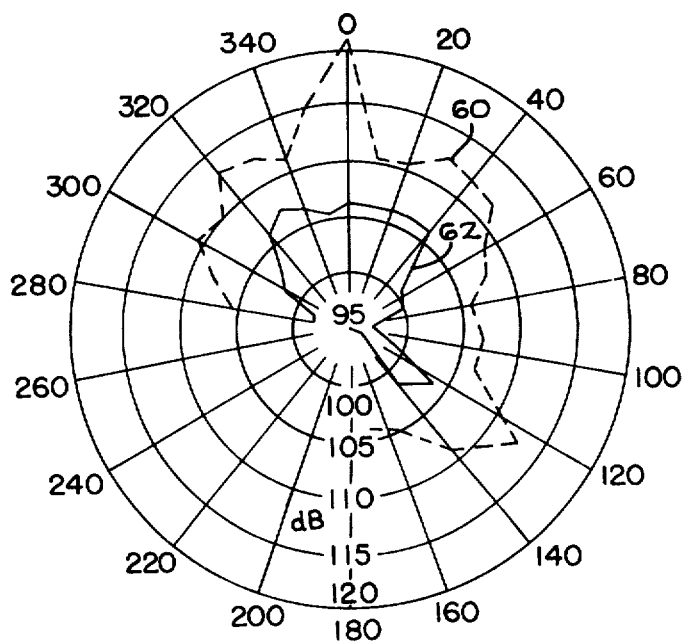

The graph of FIG. 7 affords a comparison of the embodiment of FIGS. 1 and 2, which has three annular injection nozzles, with the embodiment of FIG. 6, which has two air injection nozzles. On the abscissa, the angular position relative the axis of the engine is plotted, zero degrees representing a position directly behind the engine. On the ordinate is plotted the noise level in decibels. Curve 70 identifies the noise level of the bare engine, curve 72 identifies the noise level achieved by employment of the suppressor of FIGS. 1 and 2, and curve 74 identifies the noise level achieved by the suppressor of FIG. 6. It can be seen that both embodiments of the invention achieve significant noise suppression, the thrust loss being within acceptable limits.

Thus it can be seen that the present invention provides a noise suppressor for fan jet engines which is extremely light weight, lacks any moving parts and affords significant noise suppression without undue loss of thrust. Moreover, the invention affords significant noise suppression throughout all power settings of the fan jet engine on which it is installed. Although several embodiments of the invention have been shown and described, it will be obvious that other adaptations and modifications can be made without departing from the true spirit and scope of the invention.

What is claimed is:

1. A noise suppressor for a fan jet engine of the type that includes an elongate hollow housing having an upstream inlet and a downstream outlet, an engine pod with a longitudinal axis, the pod supported within the housing and having a converging jet nozzle symmetrical to the axis and extending downstream of the housing outlet, the pod having a cross-sectional shape smaller than the housing to define an annular by-pass air path in said housing, and a fan within the housing adjacent the inlet for supplying air to the engine pod and the by-pass path, said noise suppressor comprising a nacelle having an upstream extremity affixed to said housing outlet and a downstream circular shaped extremity which is symmetrical to said axis and disposed downstream of said converging nozzle, said nacelle having an air impervious wall that converges from said upstream extremity to said downstream extremity and confines by-pass air from said engine housing, at least a first ring airfoil rigidly mounted within said nacelle, said ring airfoil being symmetrical to said axis and having an upstream extremity upstream of the downstream extremity of said nozzle, said ring airfoil having a downstream extremity upstream of downstream extremity of said nacelle, the downstream extremities of said nozzle, ring airfoil and nacelle being positioned on a jet nozzle flow zero radial velocity locus which has the shape of a frusto conical surface whereby the by-pass air is injected into the jet nozzle flow and the local shear stress between the streams is reduced, and further including a second ring airfoil rigidly mounted within said nacelle, said second ring airfoil being symmetrical to said longitudinal axis and having an upstream extremity positioned between said nacelle and the downstream extremity of said first ring airfoil, the downstream extremity of said second ring airfoil being located on said locus.

2. A noise suppressor according to claim 1 wherein said first ring airfoil has a greater thickness-to-chord ratio than said second ring airfoil and each airfoil has a different angular orientation with respect to said axis.

3. A noise suppressor according to claim 2 wherein each ring airfoil has a low pressure surface and a high pressure surface opposite said low pressure surface, said low pressure surface being disposed adjacent to said longitudinal axis.

* * * * *